US010726011B2

(12) United States Patent
Conradi et al.

(10) Patent No.: US 10,726,011 B2
(45) Date of Patent: Jul. 28, 2020

(54) SYSTEM TO SEARCH HETEROGENEOUS DATA STRUCTURES

(71) Applicant: SAP SE, Walldorf (DE)

(72) Inventors: Christian Conradi, Walldorf (DE); Marcel Hermanns, Heidelberg (DE); Stefan Engelhardt, Bad Schoenborn (DE); Vera Thome-Fix, Oberhausen-Rheinhausen (DE); Maximilian Eisele, Hemsbach (DE); Gregor Tielsch, Ilvesheim (DE)

(73) Assignee: SAP SE, Walldorf (DE)

( * ) Notice: Subject to any disclaimer, the term of this patent is extended or adjusted under 35 U.S.C. 154(b) by 418 days.

(21) Appl. No.: 15/290,507

(22) Filed: Oct. 11, 2016

(65) Prior Publication Data

US 2018/0101572 A1 Apr. 12, 2018

(51) Int. Cl.
*G06F 16/2453* (2019.01)
*G06F 16/84* (2019.01)
*G06F 16/22* (2019.01)
*G06F 16/25* (2019.01)

(52) U.S. Cl.
CPC ...... *G06F 16/24544* (2019.01); *G06F 16/221* (2019.01); *G06F 16/2228* (2019.01); *G06F 16/25* (2019.01); *G06F 16/84* (2019.01)

(58) Field of Classification Search
CPC ......... G06F 17/30477; G06F 17/30864; G06F 16/48; G06F 17/40; G06F 16/211; G06F 16/245; G06F 16/683; G06F 16/25; G06F 8/00; G06F 9/541; H04L 67/20; H04N 21/84; H04N 21/4622; H04N 21/4828; H04N 21/235; Y10S 707/99932; Y10S 707/99933; Y10S 707/99934; Y10S 707/99935; G06Q 10/06
USPC .......... 707/635, 35, 707, 802–803, 807–808, 707/E17.108, E17.095, E17.102–E17.103
See application file for complete search history.

(56) References Cited

U.S. PATENT DOCUMENTS

| | | | | |
|---|---|---|---|---|
| 6,601,192 B1 * | 7/2003 | Bowman-Amuah | | G06F 11/3688 714/38.12 |
| 7,448,022 B1 * | 11/2008 | Ram | | G06F 8/00 717/120 |
| 8,260,820 B2 * | 9/2012 | Arad | | G06F 17/30864 707/802 |
| 8,751,466 B1 * | 6/2014 | Tsay | | G06F 17/30864 707/700 |

(Continued)

*Primary Examiner* — Alex Gofman
*Assistant Examiner* — Linh Black
(74) *Attorney, Agent, or Firm* — Buckley, Maschoff & Talwalkar LLC (57) ABSTRACT

A system includes reception of a first query to search two or more heterogeneous data providers, generation of a first query language excerpt to define a combined key column based on key columns associated with a first data provider of the two or more heterogeneous data providers, for each of two or more columns of the first data provider, generation of a second query language excerpt to map the column of the first data provider to a respective result set key column and a respective result set value column, generation of a third query language excerpt to identify two or more of the result set value columns to search, and generation of a first query language statement based on the first, second and third query language excerpts.

15 Claims, 10 Drawing Sheets

(56) References Cited

U.S. PATENT DOCUMENTS

| | | | |
|---|---|---|---|
| 2006/0022048 A1* | 2/2006 | Johnson | G06F 17/3087 235/462.1 |
| 2007/0245400 A1* | 10/2007 | Paek | G06F 17/30858 725/142 |
| 2008/0263006 A1* | 10/2008 | Wolber | G06F 17/30545 |
| 2009/0171989 A1* | 7/2009 | Byrd | G06F 16/25 |
| 2010/0153862 A1* | 6/2010 | Schreiber | G06F 9/454 715/760 |
| 2010/0241629 A1* | 9/2010 | Tatemura | G06F 17/30557 707/741 |
| 2012/0030220 A1* | 2/2012 | Edwards | G06F 16/21 707/754 |
| 2012/0143923 A1* | 6/2012 | Whitney | G06F 16/907 707/803 |
| 2014/0059035 A1* | 2/2014 | Williams | G06F 17/30011 707/711 |
| 2015/0073981 A1* | 3/2015 | Adjaoute | G06Q 30/0225 705/39 |
| 2015/0120701 A1* | 4/2015 | Schmidt | G06F 16/958 707/722 |
| 2015/0188979 A1* | 7/2015 | Almeras | H04L 67/02 709/217 |

* cited by examiner

| PurchaseOrder | Supplier | SupplierNo | PurchGrpID | PurchGrp |
|---|---|---|---|---|
| 4500004493 | Sunny Electronics GmbH | FIO-VEND03 | 1 | Einkäufer1 |
| 4500004494 | Electronics Retail & Co | FIO-VEND04 | 1 | Einkäufer1 |

*FIG. 1A*

| PurchaseRequisition | Material_No | Material_Descr | Quantity | UnitOfMeasure |
|---|---|---|---|---|
| 0010330653 | ATP_ROH057 | | 50 | PC |
| 0010330654 | ATP_ROH058 | | 40 | PC |

*FIG. 1B*

| ID | PO_Supplier | PO_SupplierNo | PO_PurchGrpID | PO_PurchGrp | PR_Material_No | PR_Material Descr | PR_Quantity | PR_UnitOfMeasure |
|---|---|---|---|---|---|---|---|---|
| 1 | Sunny Electronics GmbH | FIO-VEND03 | 1 | Einkäufer1 | | | | |
| 2 | Electronics Retail & Co | FIO-VEND04 | 1 | Einkäufer1 | | | | |
| 1234 | | | | | ATP_ROH057 | | 50 | PC |
| 4556 | | | | | ATP_ROH058 | | 40 | PC |

```
SELECT * FROM
  (
    ( SELECT DISTINCT 'PurchaseOrder' AS "SemanticObject",        405
        CONCAT( "EBELN", CONCAT( '$$$' , "EBELP" ) ) AS "ID" ,     410
        score() AS "SCORE" ,
        '' AS "WHY_FOUND" ,
        CONCAT( "BATXT", CONCAT( ',' , "EBELN" ) ) AS "TITLE" ,    440
        'Supplier' AS "ATTR1_KEY" ,
        "NAME1" AS "ATTR1_VAL" ,
        'Supplier Number' AS "ATTR2_KEY" ,
        "LIFNR" AS "ATTR2_VAL" ,
        'Purchasing Group ID' AS "ATTR3_KEY" ,
        "EKGRP" AS "ATTR3_VAL" ,
  420 < 'Purchasing Group' AS "ATTR4_KEY" ,
        "EKNAM" AS "ATTR4_VAL" ,
        'Purchasing Organization ID' AS "ATTR5_KEY" ,
        "EKORG" AS "ATTR5_VAL" ,
        'Purchasing Organization' AS "ATTR6_KEY" ,
        "EKOTX" AS "ATTR6_VAL" ,
        'HTTP://' AS "ODATA"
      FROM SAPER3.CDS_M_M2S_PO_ITM
      WHERE  CONTAINS( ( NAME1 , LIFNR , EBELN , TX201 , NAME1_P ,   430
                         MATNR , KONNR , BANFN ), '*' )
      LIMIT 5
    )
400<
    UNION
    (
      SELECT DISTINCT 'PurchaseRequisition' AS "SemanticObject",    460
        CONCAT( "BANFN", CONCAT( '$$$' , "BNFPO" ) ) AS "ID" ,
        score() AS "SCORE" ,
        '' AS "WHY_FOUND" ,
        CONCAT( "TX201", CONCAT( ',' , CONCAT( "BANFN", CONCAT( ',' ,   470
        "BNFPO" ) ) ) ) AS "TITLE" ,
        'Material Number' AS "ATTR1_KEY" ,
        "MATNR" AS "ATTR1_VAL" ,
        'Material Description' AS "ATTR2_KEY" ,
        "MAKTX" AS "ATTR2_VAL" ,
  450 < 'Quantity' AS "ATTR3_KEY" ,
        "MENGE" AS "ATTR3_VAL" ,
        'Unit of Measure' AS "ATTR4_KEY" ,     480
        "MEINS" AS "ATTR4_VAL" ,
        'Price' AS "ATTR5_KEY" ,
        "PREIS" AS "ATTR5_VAL" ,
        'Currency' AS "ATTR6_KEY" ,
        "WAERS" AS "ATTR6_VAL" ,
        'HTTP://' AS "ODATA"
      FROM SAPER3.CDS_M_M2S_PR_ITM
      WHERE  CONTAINS( ( BANFN , MATNR , NAME1_P , EKOTX , EKNAM ), '*' )   490
      LIMIT 5
    )
  )
```

*FIG. 4*

| ObjectType | ID | Attr1Key | Attr1Value | Attr2Key | Attr2Value | Attr3Key | Attr3Value | Attr4Key | Attr4Value |
|---|---|---|---|---|---|---|---|---|---|
| PurchaseOrder | 4500004493 | Supplier | Sunny Electronics GmbH | SupplierNo | FIO-VEND03 | PurchGrpID | 1 | PurchGrp | Einkäufer1 |
| PurchaseOrder | 4500004494 | Supplier | Electronics Retail & Co | SupplierNo | FIO-VEND04 | PurchGrpID | 1 | PurchGrp | Einkäufer1 |
| PurchasingRequisition | 0010330653 | Material_No | ATP_ROH057 | Material_Descr | | Quantity | 50 | UnitOfMeasure | PC |
| PurchasingRequisition | 0010330654 | Material_No | ATP_ROH058 | Material_Descr | | Quantity | 40 | UnitOfMeasure | PC |

Generic Union Search

| Sunny | | Search | | | |
|---|---|---|---|---|---|
| Object Type | Title | Key-Val Pair1 | Key-Val Pair2 | Key-Val Pair3 | |
| PurchaseOrder | 4500004493 | Supplier: Sunny Electronics GmBH | Supplier Number: FIO-VEND03 | Purchasing Group ID: 1 | |
| PurchaseRequisition | 0010330653 | Material Number: ATP-ROH057 | Material Description: | Quantity: 50 | |

SYSTEM TO SEARCH HETEROGENEOUS DATA STRUCTURES

BACKGROUND

Enterprise software systems receive, generate, and store data related to many aspects of an enterprise. Users operate reporting tools to search such data and display a result set.

Figure 1A:
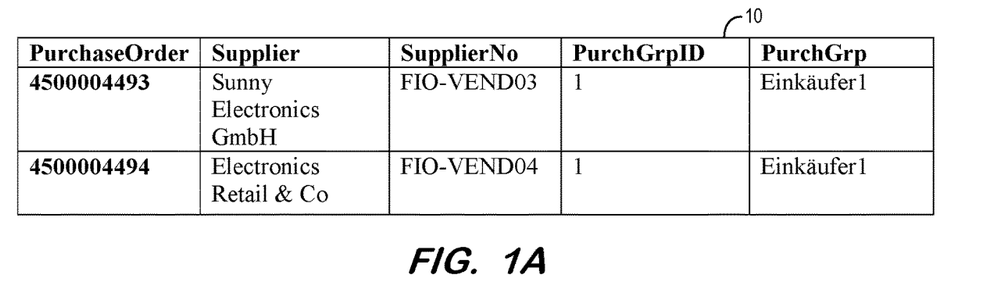
FIGS. 1A through 1C comprise example database tables.
Figure 1B:
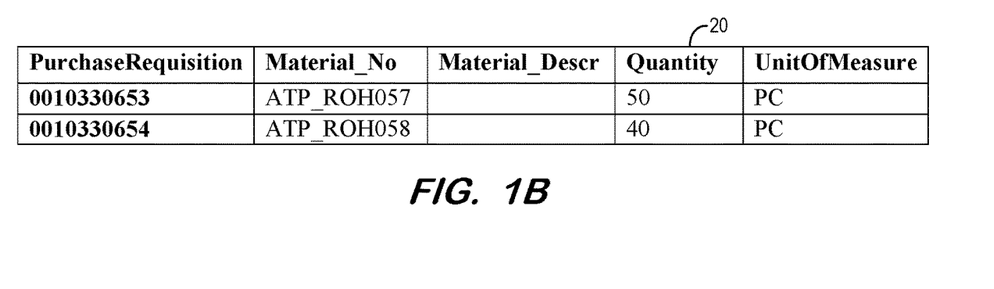

In some scenarios, a search covers several different data objects. As illustrated in FIGS. 1A and 1B, these different objects (e.g., different database tables and/or different database views) might exhibit heterogeneous structures (e.g., different table columns). Heterogeneous structures cannot be processed with a simple Structured Query Language (SQL) statement.

Figure 1C:
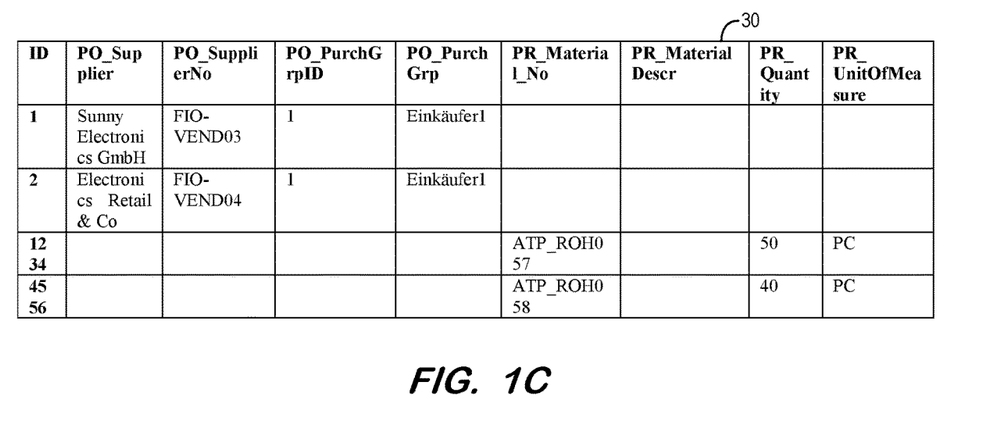

For example, if a result set consisted of all rows of tables 10 and 20, the rows may be joined by a UNION operation to result in table 30 of FIG. 1C. Table 30 is composed of the columns of tables 10 and 20, simply placed side by side, resulting in many allocated but unused cells. This inefficiency increases exponentially with increasing numbers of heterogeneous data objects. Moreover, in order to render the result table in a coherent manner, a generic user interface (UI) tool would require logic specific to each possible combination of searched data objects and the column structure of the resulting tables.

BRIEF DESCRIPTION OF THE DRAWINGS

FIG. 4 illustrates an SQL statement according to some embodiments.

FIG. 7 illustrates a result set returned according to some embodiments.

DETAILED DESCRIPTION

The following description is provided to enable any person in the art to make and use the described embodiments. Various modifications, however, will remain readily apparent to those in the art.

Generally, some embodiments synthesize disparate columns of two or more data providers into a homogeneous set of key column/value column pairs. UI tools may be fashioned to receive result rows in this key column/value column pair format and display the results in an intelligible manner. Because the homogeneous key column/value column pair result set format may be generated regardless of the various structures (schemas) of the data providers over which the search is conducted, such UI tools may be used for any combination of data providers.

As a brief non-exhaustive introduction to some embodiments, a search query may be initially received from a client. The search query may comprise one or more words, and the intent of the search query is to identify one or more rows of two or more data providers which match (e.g., include) the one or more words. At least two or more of the data providers are heterogeneous. For example, the columns of one of the data providers are different, in number, name, semantic and/or type, from the columns of another one of the data providers. For example, the data providers may comprise database tables 10 and 20 of FIGS. 1A and 1B.

Figure 5:
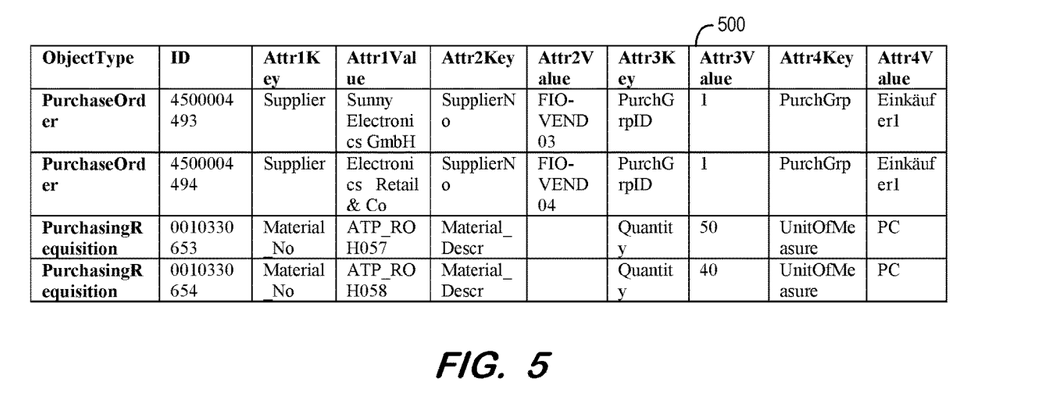
FIG. 5 illustrates a table generated according to some embodiments.

After receiving the query, a query language statement is generated to define a table comprising the data of the one or more data providers. The defined table is composed of key column and value column pairs, each of which is associated with a column of each of one of the one or more data providers. Table 500 of FIG. 5 illustrates key column and value column pairs according to some embodiments.

As shown, a key column "Attr1Key" and a value column "Attr1Value" are defined and populated with the values of the Supplier column of table 10. Specifically, for each row of the Supplier column, a row of the Attr1Key column is populated with the value "Supplier" and the corresponding rows of Attr1Value are populated with the values of the rows of the Supplier column of table 10.

The Material_No column of table 20 is also associated with the key column "Attr1Key" and the value column "Attr1Value". Again, for each row of the Material_No column, a row of the Attr1Key column is populated with the value "Material_No" and the corresponding rows of Attr1Value are populated with the values of the rows of the Material_No column of table 20. The other columns of tables 20 and 30 are processed similarly, as shown in table 500.

Figure 2:
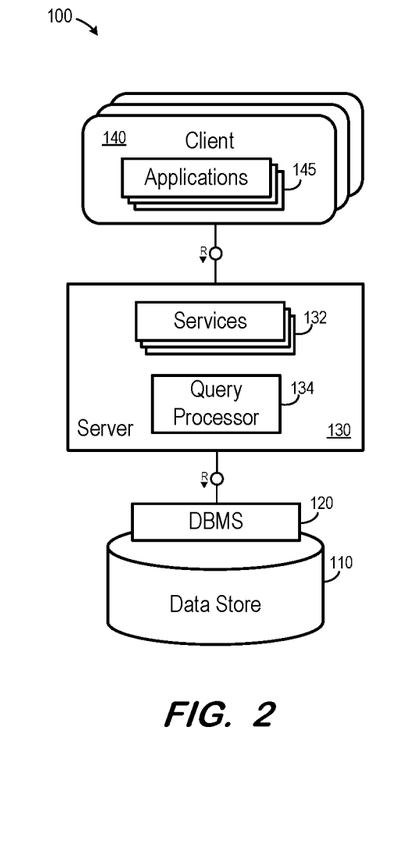
FIG. 2 is a block diagram of a system architecture according to some embodiments.

FIG. 2 is a block diagram of architecture 100 according to some embodiments. Embodiments are not limited to architecture 100 or to a database architecture.

Architecture 100 includes data store 110, database management system (DBMS) 120, server 130, services 132, query processor 134, clients 140 and applications 145. Generally, services 132 executing within server 130 receive requests from applications 145 executing on clients 140. These request may include search queries, which are processed by query processor 134 to obtain results from DBMS 120. The results are then provided to applications 145 based on data stored within data store 110.

Applications 145 may interact with a semantic layer defining a set of abstract semantic objects. Each semantic object associates one or more physical entities (e.g., a physical database table, associated columns of one or more database tables, etc.) of one or more data sources with user-friendly names. Semantic objects may be classified as dimensions along which one may want to perform an analysis or report (e.g., Year, Country, Product), or measures (e.g., Sales, Profit), whose values can be determined for a given combination of dimension values.

System 100 includes metadata describing the structures and data stored within data store 110. The metadata be stored in data store 110 and/or a separate repository (not shown). The metadata may include information regarding semantic objects, dimension names (e.g., Country, Year, Product), dimension hierarchies (e.g., Country>State>City), measure names (Profit, Units, Sales), their mappings to respective physical entities (e.g., table columns) of data store 110, and any other suitable metadata. According to some embodiments, the metadata of system 100 may also define the key columns of a database table or database view, other descriptive columns, columns over which searches are to be conducted, etc.

Services 132 and query processor 134 may comprise server-side executable program code (e.g., compiled code, scripts, etc.) which provide functionality to applications 145 by providing user interfaces to clients 140, receiving requests from applications 145, retrieving data from data store 110 based on the requests, processing the data received from data store 110, and providing the processed data to applications 145.

In one specific example, a client 140 executes an application 145 to present a user interface to a user on a display of the client 140. The user enters a query into the user interface. The application 145 passes a request including the query to server 130, which forwards the request to query processor 134. An SQL script is generated based on the request and forwarded to DBMS 120. DBMS 120 executes the SQL script to return a result set based on data of data store 110, and the application 145 creates a report/visualization based on the result set.

Server 130 provides any suitable protocol interfaces through which applications 145 executing on clients 140 may communicate with server 130. For example, server 130 may include a HyperText Transfer Protocol (HTTP) interface supporting a transient request/response protocol over Transmission Control Protocol (TCP), and/or a WebSocket interface supporting non-transient full-duplex communications between server 130 and any clients 140 which implement the WebSocket protocol over a single TCP connection. One or more of services 132 and query processor 134 executing on server 130 may communicate with DBMS 120 using database management interfaces such as, but not limited to, Open Database Connectivity (ODBC) and Java Database Connectivity (JDBC) interfaces.

DBMS 120 serves requests to query, retrieve, create, modify (update), and/or delete data of data store 110, and also performs administrative and management functions. Such functions may include snapshot and backup management, indexing, optimization, garbage collection, and/or any other database functions that are or become known. DBMS 120 may also provide application logic, such as database procedures and/or calculations, according to some embodiments. This application logic may comprise scripts, functional libraries and/or compiled program code.

Server 130 may be separated from or closely integrated with DBMS 120. A closely-integrated server 130 may enable execution of services 132 and query processor 134 completely on the database platform, without the need for an additional server. For example, according to some embodiments, server 130 provides a comprehensive set of embedded services which provide end-to-end support for Web-based applications. The services may include a lightweight web server, configurable support for Open Data Protocol, server-side JavaScript execution and access to SQL and SQLScript.

Data store 110 may comprise any query-responsive data source or sources that are or become known, including but not limited to a structured-query language (SQL) relational database management system. Data store 110 may comprise a relational database, a multi-dimensional database, an eXtendable Markup Language (XML) document, or any other data storage system storing structured and/or unstructured data. The data of data store 110 may be distributed among several relational databases, dimensional databases, and/or other data sources. Embodiments are not limited to any number or types of data sources.

In some embodiments, the data of data store 110 may comprise one or more of conventional tabular data, row-based data, column-based data, and object-based data. Moreover, the data may be indexed and/or selectively replicated in an index to allow fast searching and retrieval thereof. Data store 110 may support multi-tenancy to separately support multiple unrelated clients by providing multiple logical database systems which are programmatically isolated from one another.

Data store 110 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Each of clients 140 may comprise one or more devices executing program code of an application 145 for presenting user interfaces to allow interaction with application server 130. The user interfaces of applications 145 may comprise user interfaces suited for searching, reporting, data analysis, and/or any other functions based on the data of data store 110.

Presentation of a user interface as described herein may comprise any degree or type of rendering, depending on the type of user interface code generated by server 130. For example, a client 140 may execute a Web Browser to request and receive a Web page (e.g., in HTML format) from application server 130 via HTTP, HTTPS, and/or WebSocket, and may render and present the Web page according to known protocols. One or more of clients 140 may also or alternatively present user interfaces by executing a stand-alone executable file (e.g., an .exe file) or code (e.g., a JAVA applet) within a virtual machine. In another method, one of more of clients 140 execute applications 145 loaded from server 130, that receive data and metadata by requests to services 132 and query processor 134 executed on the server 130. Data and metadata is processed by the applications 145 to render the user interface on the client 140.

Figure 3A:
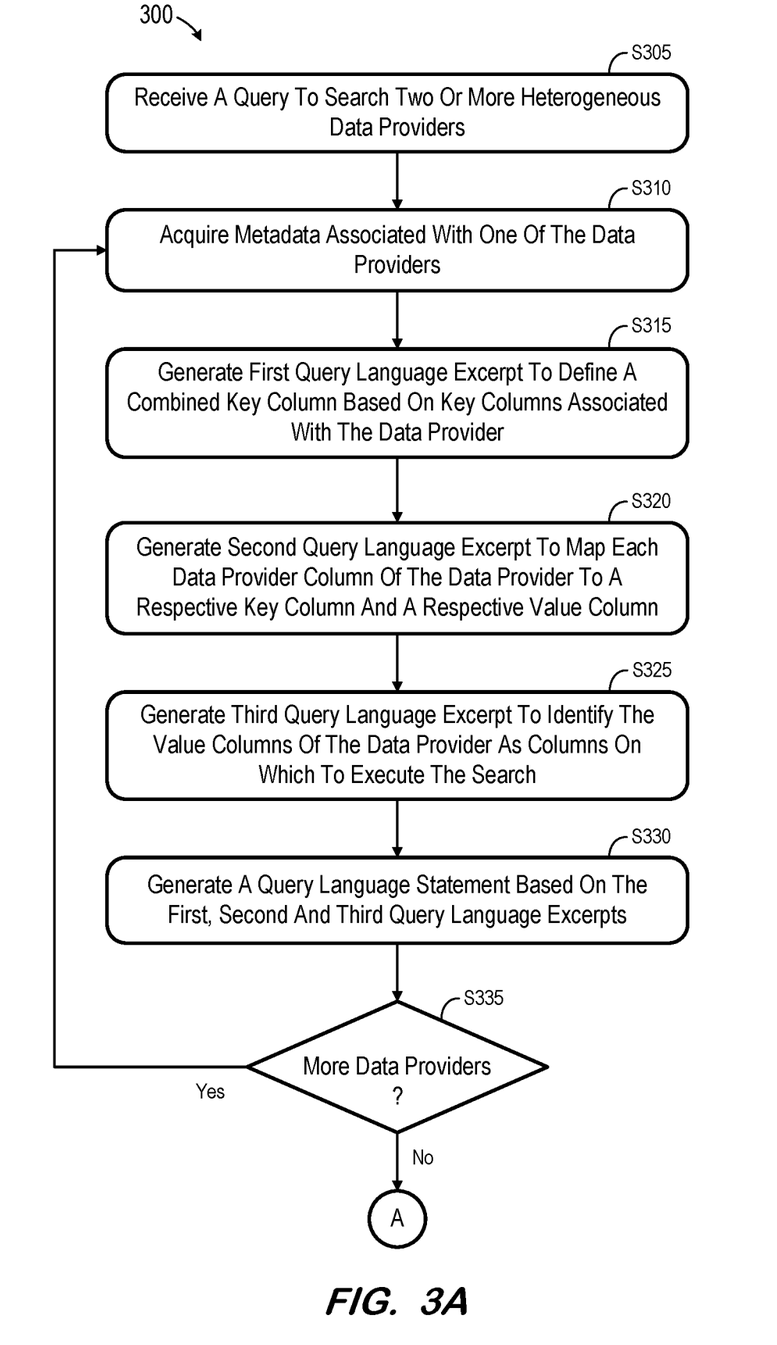
FIGS. 3A and 3B comprise a flow diagram of process steps according to some embodiments.
Figure 3B:
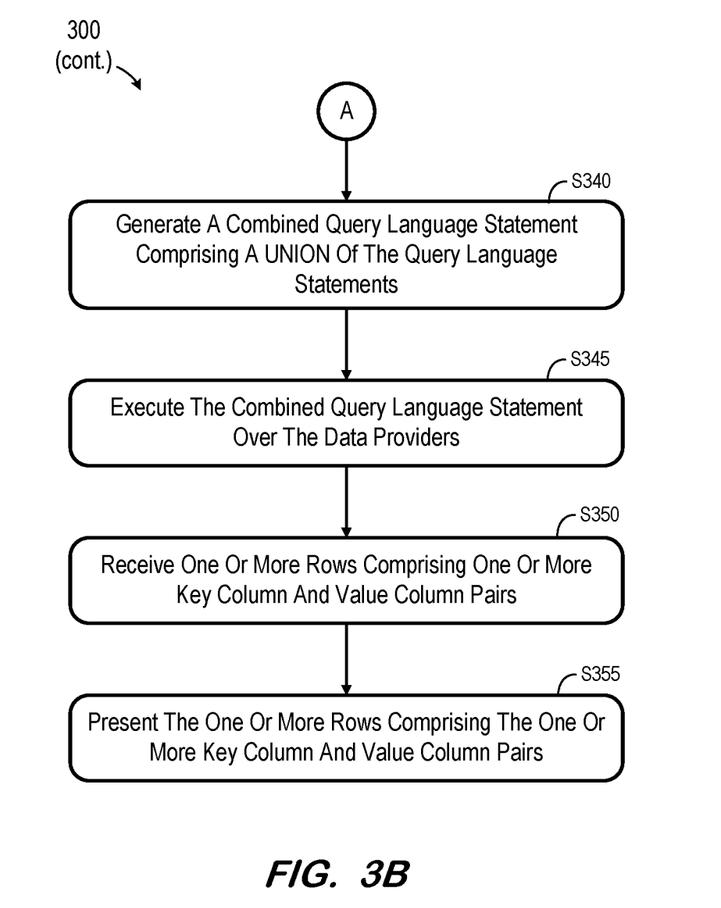

FIGS. 3A and 3B comprise a flow diagram of process 300 according to some embodiments. In some embodiments, various hardware elements of system 100 execute program code to perform process 300. Process 300 and all other processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, a query is received from a user at S305. The query may include any string of characters according to some embodiments. The query is intended to search two or more data providers, at least two of which are heterogeneous. The data providers (e.g., database tables and/or views) may comprise the data providers of data store 110 to which the user has access. The accessible data providers may differ from user-to-user based on the affiliations and authorizations of the users.

Next, at S310, metadata associated with one of the data providers is acquired. The metadata describes the structure of the data provider, including its column names, its key columns, and, in some embodiments, one or more "important" key columns which may collectively serve to best identify the data of their corresponding rows. The metadata may be stored in data store 110 and acquired by query processor 134. In this regard, program code of query processor 134 is executed to cause server 130 to perform S305 through S340 according to some embodiments.

A first query language excerpt is generated at S315 based on the metadata. The first query language excerpt is to generate a combined key column of an intermediate result table, based on key columns associated with the data provider. For example, assuming that the data provider is a PurchaseOrder database table as shown in FIG. 1A, the first query language excerpt may comprise CONCAT ("EBELN", CONCAT ('$$$', "EBELP")) AS "ID". In this example, EBELN represents row values of the (sole) key column identified in the metadata of the PurchaseOrder table.

At S320, a second query language excerpt is generated to map each column of the data provider to a respective key column and a respective value column. Turning again to the example of FIG. 1A, the second query language excerpt may map the Supplier column of table 10 to a key column "Attr1_Key" and to a value column "Attr1_Value". An example of a second query language excerpt according to some embodiments is 'Supplier' AS "ATTR1_KEY", "NAME1" AS "ATTR1_VAL", where 'Supplier' is an actual value used to populate the rows of the column Attr1_Key associated with table 10, and "NAME1" represents the actual values stored in the Supplier column of these rows. Although the mapping of only one column is discussed above, the second query language excerpt includes such a mapping for each column of the data provider.

A third query language excerpt is generated at S325. The third query language excerpt is intended to identify value columns of each key column/value column pair over which the search is to be conducted. For example, the metadata of the data provider may indicate that only a subset of the columns of the data provider should be searched.

A query language statement is generated at S330 based on the first, second and third subsets of query language. FIG. 4 illustrates query language statement 400 which is generated according to some embodiments of S330 according to the present example. Statement line 405 indicates the data provider (i.e., PurchaseOrder) associated with the generated statement, and from which data is selected to generate rows of an intermediate table as described herein.

Statement line 410 includes the first query language excerpt generated at S315, and statement lines 420 include the second query language excerpts generated at S320 according to some embodiments. Statement lines 420 include key column/value column pairs for two columns "PurchasingOrgID" and "PurchasingOrg" of the data provider PurchaseOrder which are not illustrated in FIG. 1A. Statement lines 420 search the data provider PurchaseOrder and map data provider to a uniform format over which the result set can be unioned with a result set associated with a heterogeneous data provider.

Statement lines 430 include the third query language excerpt generated at S325. In particular, the CONTAINS predicate allows the specification of a list of columns to search and a search condition, using the syntax CONTAINS ((column_list), search_condition). Because the search condition is specified as "*", statement 430 results in returning all rows of the data provider. In a case that one or more search terms were received at S305, those search terms would be substituted for the wildcard "*".

The FIG. 4 example also includes statement line 440, which populates a "Title" column in the intermediate table. The Title column may be populated with concatenated values from selected "important" columns of the data provider. As described above, the metadata for the data provider may define such "important" columns.

As mentioned above, at least two data providers are to be searched. It is determined at S335 whether query language has been generated for each data provider that is to be searched. If not, flow returns to S310 and continues as described above with respect to another of the data providers. According to the present example, S310 through S330 are repeated for the data provider PurchaseRequistion, an example of which is illustrated in FIG. 1B. As a result, query language statement 450 of FIG. 4 is generated.

Statement line 460 indicates the data provider (i.e., PurchaseRequistion) associated with the generated statement. Statement lines 470 populate the ID column and the Title column in the intermediate table as described above. Statement lines 480 include key column/value column pairs for each column of table 20, including two columns "Price" and "currency" which are not illustrated in FIG. 1B. Statement lines 490 include the third query language excerpt generated at S325. Statement lines 490 include columns from the second data provider. Although some of the columns names within statement lines 490 are identical to the column names of statement lines 430, statement lines 490 refer to columns of PurchaseRequistion and statement lines 430 refer to columns of PurchaseOrder.

Returning to process 300, a combined query language statement is generated at S340. The combined query language statement comprises a UNION of the query language statements generated at S330 (i.e., one per data provider). The entire statement illustrated in FIG. 4 is an example of a combined query language statement generated at S340 according to some embodiments.

The combined query language statement is executed over the data providers at S345. S345 may comprise transmitting the combined statement to DBMS 120, which instructs execution of the combined query language statement to return data in a specified format (i.e., the format specified by the combined query language statement). Specifically, execution of the combined query language statement populates an intermediate table composed of key column and value column pairs, each of which is associated with a column of each of the one or more data providers.

Table 500 of FIG. 5 is an intermediate table which is populated and returned via execution of the combined statement of FIG. 4. Table 500 includes key column and value column pairs according to some embodiments. For each row of the Supplier column of table 10, a row of the Attr1Key column is populated with the value "Supplier" and the corresponding rows of the Attr1Value column are populated with the values of the rows of the Supplier column of table 10. Similarly, and based on lines 480 of statement 450, for each row of the Material_No column of table 20, a row of the Attr1Key column is populated with the value "Material_No" and the corresponding rows of the Attr1Value column are populated with the values of the rows of the Material_No column of table 20. The other columns of tables 10 and 20 are processed similarly. Table 500 only shows four key column/value column pairs, although the combined statement of FIG. 4 populates an intermediate table with six key column/value column pairs as described above.

Figure 6:
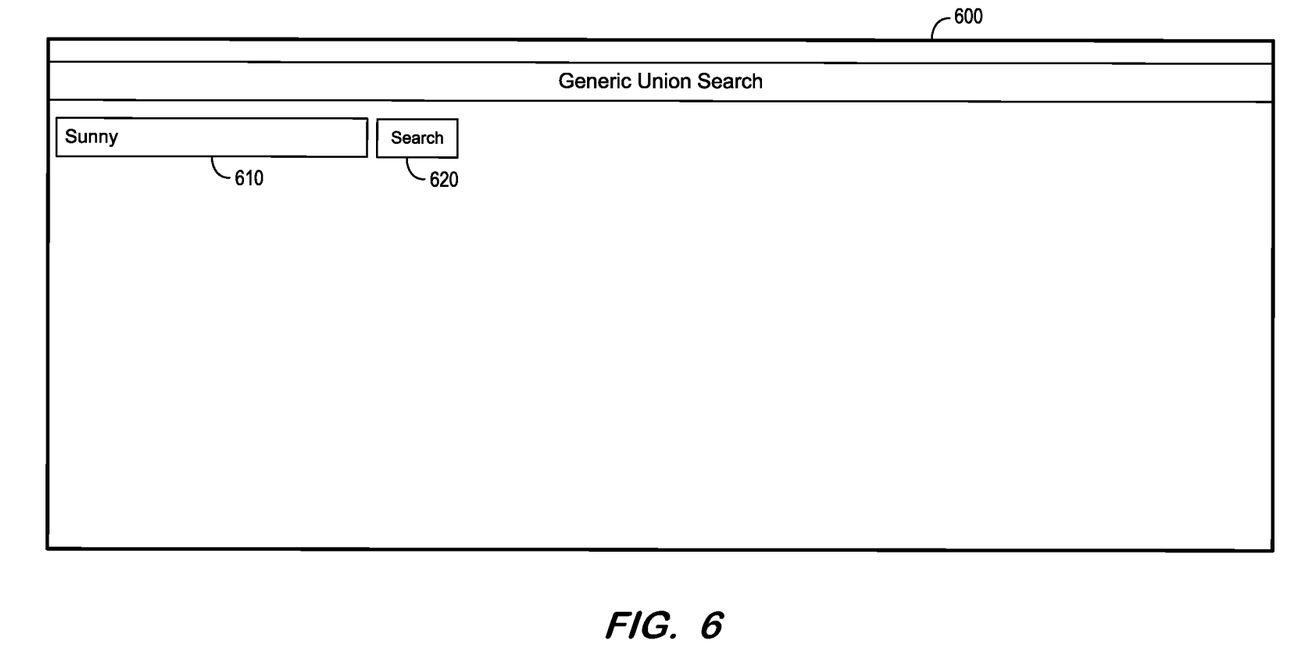
FIG. 6 is an outward view of a displayed user interface according to some embodiments.

An example of a specific query will now be provided. FIG. 6 illustrates interface 600 to receive a query from a user according to some embodiments. As shown, a user has entered the search terms "Sunny" into input field 610. Interface 600 may comprise a Web page provided by server 130 in response to a request from a Web browser application 145 executing on client 140. Any client application 145 may be used to display interface 300, which is not limited to Web-based formats.

The user selects Search UI control 620 to transmit a query to server 130. According to some embodiments, query processor 134 may execute S310 through S340 to generate a combined query language statement as illustrated in FIG. 4. Unlike FIG. 4, the third query language excerpts include the search term "Sunny" within their WHERE CONTAINS clauses (e.g., WHERE CONTAINS (column_list), "Sunny").

The combined query language statement is executed over the data providers and one or more result rows are received at S350. The result rows comprise one or more key column and value column pairs as defined by the query language statements generated at S330. FIG. 7 illustrates formatted results 700 according to some embodiments. Lines 710 represent a first row of the intermediate table and lines 720 represent a second row.

According to some embodiments, results 700 are transmitted to an application 145 from which the query was received, and the application 145 presents the results at S355. Application 145, as mentioned above, includes logic to present the column pairs in an intelligible manner. For example, the application 145 may that the column headings ending with "Key" correspond to column names, while those column heading ending with "Value" correspond to values of their corresponding paired key column.

Figure 8:
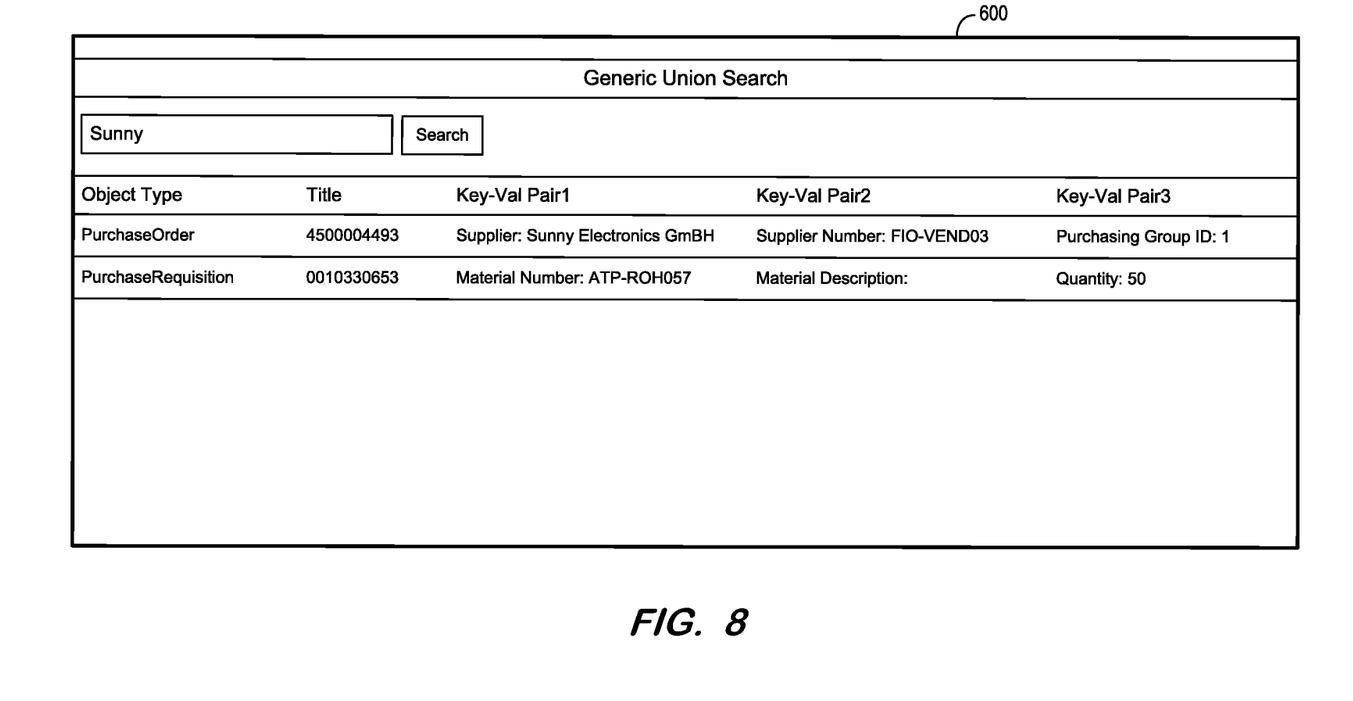
FIG. 8 is an outward view of a displayed user interface including a result set according to some embodiments.

FIG. 8 illustrates user interface 600 presenting the one or more rows of results 700 according to some embodiments. As shown, the columns Object Type and Title are treated as "normal" columns because they are not paired with other columns in results 700 (e.g., using the "Attr#" tag). However, the "Attr1" pair is displayed together i.e., (as Key-Value Pair1), the "Attr2" pair is displayed together i.e., (as Key-Value Pair2), and the "Attr3" pair is displayed together i.e., (as Key-Value Pair3). Results 700 include three additional pairs, which are not presented in FIG. 8 due to space considerations.

Figure 9:
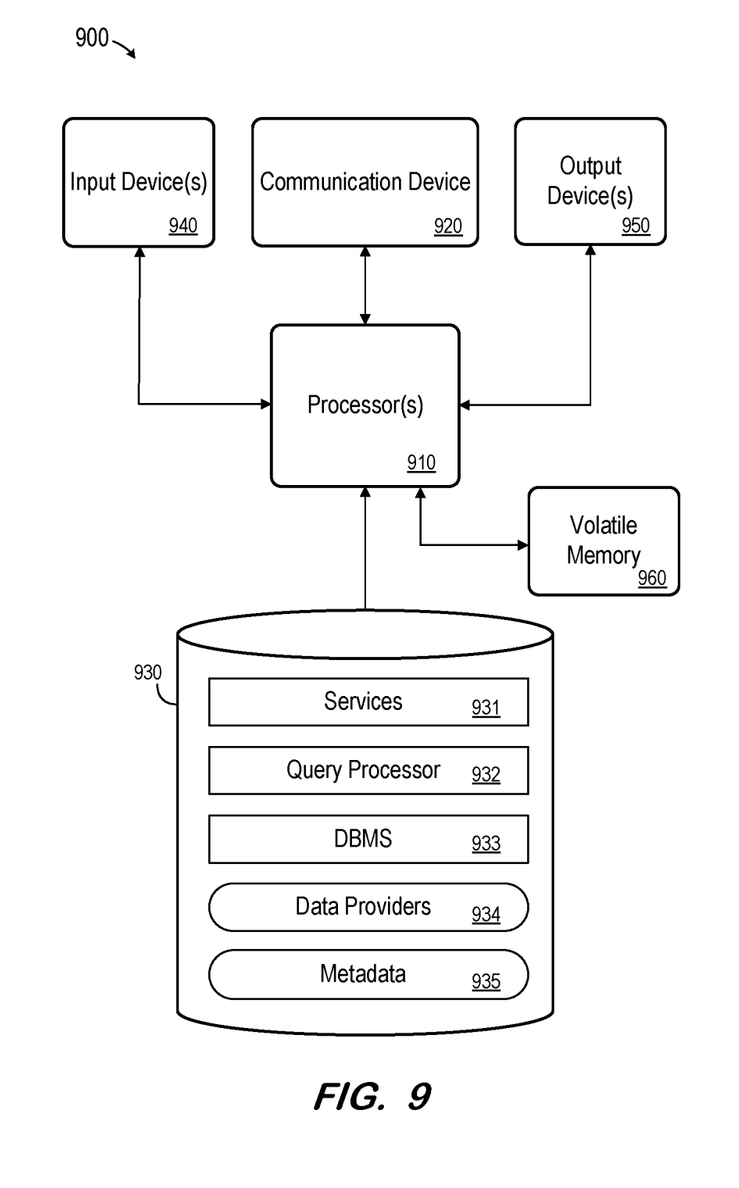
FIG. 9 is a block diagram of a computing system according to some embodiments.

FIG. 9 is a block diagram of apparatus 900 according to some embodiments. Apparatus 900 may comprise a general-purpose computing apparatus and may execute program code to perform any of the functions described herein. Apparatus 900 may comprise an implementation of server 130, DBMS 120 and data store 110 of FIG. 1 in some embodiments. Apparatus 900 may include other unshown elements according to some embodiments.

Apparatus 900 includes processor(s) 910 operatively coupled to communication device 920, data storage device 930, one or more input devices 940, one or more output devices 950 and memory 960. Communication device 920 may facilitate communication with external devices, such as a reporting client, or a data storage device. Input device(s) 940 may comprise, for example, a keyboard, a keypad, a mouse or other pointing device, a microphone, knob or a switch, an infra-red (IR) port, a docking station, and/or a touch screen. Input device(s) 940 may be used, for example, to enter information into apparatus 900. Output device(s) 950 may comprise, for example, a display (e.g., a display screen) a speaker, and/or a printer.

Data storage device 930 may comprise any appropriate persistent storage device, including combinations of magnetic storage devices (e.g., magnetic tape, hard disk drives and flash memory), optical storage devices, Read Only Memory (ROM) devices, etc., while memory 960 may comprise Random Access Memory (RAM), Storage Class Memory (SCM) or any other fast-access memory.

Services 931, query processor 932 and DBMS 933 may comprise program code executed by processor 910 to cause apparatus 900 to perform any one or more of the processes described herein. Embodiments are not limited to execution of these processes by a single apparatus.

Data providers 934 and metadata 935 (either cached or a full database) may be stored in volatile memory such as memory 960. Data storage device 930 may also store data and other program code for providing additional functionality and/or which are necessary for operation of apparatus 900, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
   a data storage system storing two or more heterogeneous data providers; and
   a query processing device comprising one or more processors to execute processor-executable process steps to:
   receive a first query to search the two or more heterogeneous data providers;
   in response to reception of the first query, acquire metadata associated with a first data provider of the two or more heterogeneous data providers, the metadata describing a database table or database view schema of the first data provider including describing key columns of the database table or the database view associated with the first data provider;
   generate, based on the metadata associated with the first data provider, a first query language excerpt to define a combined key column based on the key columns associated with the first data provider of the two or more heterogeneous data providers;
   for each column of the first data provider, generate a second query language excerpt to map each of the columns of the first data provider to a respective result set key column and a respective result set value column;

generate, based on the metadata associated with the first data provider, a third query language excerpt to identify two or more of the result set value columns to search;

generate a first query language statement based on the first, second and third query language excerpts;

in response to reception of the first query, acquire metadata associated with a second data provider of the two or more heterogeneous data providers, the metadata associated with a second data provider describing a database table or a database view schema of the second data provider including describing key columns of the database table or the database view associated with the second data provider;

generate, based on the metadata associated with the second data provider, a fourth query language excerpt to define a second combined key column based on key columns associated with the second data provider of the two or more heterogeneous data providers;

for each column of the second data provider, generate a fifth query language excerpt to map each of the columns of the second data provider to one of the respective result set key columns and to one of the respective result set value columns;

generate, based on the metadata associated with the second data provider, a sixth query language excerpt to identify two or more of the result set value columns to search;

generate a second query language statement based on the fourth, fifth and sixth query language excerpts; and generate a combined query language statement comprising a UNION of the first query language statement and the second query language statement.

2. A system according to claim 1, wherein the second query language excerpt to map the column of the first data provider comprises query language to map a name of the column of the first data provider to each row of the respective result set key column and to map a value of each row of the column of the first data provider to a respective row of the respective result set value column.

3. A system according to claim 1, wherein the second query language excerpt to map the column of the first data provider comprises query language to map a name of the column of the first data provider to each row of the respective result set key column and to map a value of each row of the column of the first data provider to a respective row of the respective result set value column, and wherein the fifth query language excerpt to map the column of the second data provider comprises query language to map a name of the column of the second data provider to each row of the respective result set key column and to map a value of each row of the column of the second data provider to a respective row of the respective result set value column.

4. A system according to claim 1, the one or more processors to execute processor-executable process steps to:

execute the combined query language statement over the two or more data providers; and receive one or more result rows, each of the one or more result rows comprising one or more pairs of a key column and a value column.

5. A system according to claim 4, further comprising a client device comprising one or more processors to execute processor-executable process steps to:

transmit the first query to the query processing device; and for each pair of a key column and a value column, present the value of a row of the key column adjacent to the value of the row of the value column.

6. A system comprising:

a memory storing processor-executable process steps; and a processor to execute the processor-executable process steps to cause the system to:

receive a first query to search two or more heterogeneous data providers;

in response to reception of the first query, acquire metadata associated with a first data provider of the two or more heterogeneous data providers, the metadata describing a database table or database view schema of the first data provider including describing key columns of the database table or the database view associated with the first data provider;

generate, based on the metadata associated with the first data provider, a first query language excerpt to define a combined key column based on the key columns associated with the first data provider of the two or more heterogeneous data providers;

for each column of the first data provider, generate a second query language excerpt to map each of the columns of the first data provider to a respective result set key column and a respective result set value column;

generate, based on the metadata associated with the first data provider, a third query language excerpt to identify two or more of the result set value columns to search;

generate a first query language statement based on the first, second and third query language excerpts;

in response to reception of the first query, acquire metadata associated with a second data provider of the two or more heterogeneous data providers, the metadata associated with a second data provider describing a database table or a database view schema of the second data provider including describing key columns of the database table or the database view associated with the second data provider;

generate, based on the metadata associated with the second data provider, a fourth query language excerpt to define a second combined key column based on key columns associated with the second data provider of the two or more heterogeneous data providers;

for each column of the second data provider, generate a fifth query language excerpt to map each of the columns of the second data provider to one of the respective result set key columns and to one of the respective result set value columns;

generate, based on the metadata associated with the second data provider, a sixth query language excerpt to identify two or more of the result set value columns to search;

generate a second query language statement based on the fourth, fifth and sixth query language excerpts; and generate a combined query language statement comprising a UNION of the first query language statement and the second query language statement.

7. A system according to claim 6, wherein the second query language excerpt to map the column of the first data provider comprises query language to map a name of the column of the first data provider to each row of the respective result set key column and to map a value of each row of the column of the first data provider to a respective row of the respective result set value column.

8. A system according to claim 6, wherein the second query language excerpt to map the column of the first data provider comprises query language to map a name of the column of the first data provider to each row of the respective result set key column and to map a value of each row of the column of the first data provider to a respective row of the respective result set value column, and
    wherein the fifth query language excerpt to map the column of the second data provider comprises query language to map a name of the column of the second data provider to each row of the respective result set key column and to map a value of each row of the column of the second data provider to a respective row of the respective result set value column.

9. A system according to claim 6, the processor to further execute the processor-executable process steps to cause the system to:
    execute the combined query language statement over the two or more data providers; and
    receive one or more result rows, each of the one or more result rows comprising one or more pairs of a key column and a value column.

10. A system according to claim 9, the processor to further execute the processor-executable process steps to cause the system to:
    for each pair of a key column and a value column, present the value of a row of the key column adjacent to the value of the row of the value column.

11. A computer-implemented method comprising:
    receiving a first query to search two or more heterogeneous data providers;
    in response to reception of the first query, acquire metadata associated with a first data provider of the two or more heterogeneous data providers, the metadata describing a database table or database view schema of the first data provider including describing key columns of the database table or the database view associated with the first data provider;
    generating, based on the metadata associated with the first data provider, a first query language excerpt to define a combined key column based on the key columns associated with the first data provider of the two or more heterogeneous data providers;
    for each column of the first data provider, generating a second query language excerpt to map each of the columns of the first data provider to a respective result set key column and a respective result set value column;
    generating, based on the metadata associated with the first data provider, a third query language excerpt to identify two or more of the result set value columns to search;
    generating a first query language statement based on the first, second and third query language excerpts;
    in response to reception of the first query, acquiring metadata associated with a second data provider of the two or more heterogeneous data providers, the metadata associated with a second data provider describing a database table or a database view schema of the second data provider including describing key columns of the database table or the database view associated with the second data provider;
    generating, based on the metadata associated with the second data provider, a fourth query language excerpt to define a second combined key column based on key columns associated with the second data provider of the two or more heterogeneous data providers;
    for each column of the second data provider, generating a fifth query language excerpt to map each of the columns of the second data provider to one of the respective result set key columns and to one of the respective result set value columns;
    generating, based on the metadata associated with the second data provider, a sixth query language excerpt to identify two or more of the result set value columns to search;
    generating a second query language statement based on the fourth, fifth and sixth query language excerpts; and
    generating a combined query language statement comprising a UNION of the first query language statement and the second query language statement.

12. A method according to claim 11, wherein the second query language excerpt to map the column of the first data provider comprises query language to map a name of the column of the first data provider to each row of the respective result set key column and to map a value of each row of the column of the first data provider to a respective row of the respective result set value column.

13. A method according to claim 11, wherein the second query language excerpt to map the column of the first data provider comprises query language to map a name of the column of the first data provider to each row of the respective result set key column and to map a value of each row of the column of the first data provider to a respective row of the respective result set value column, and
    wherein the fifth query language excerpt to map the column of the second data provider comprises query language to map a name of the column of the second data provider to each row of the respective result set key column and to map a value of each row of the column of the second data provider to a respective row of the respective result set value column.

14. A method according to claim 11, further comprising:
    executing the combined query language statement over the two or more data providers; and
    receiving one or more result rows, each of the one or more result rows comprising one or more pairs of a key column and a value column.

15. A method according to claim 14, further comprising:
    for each pair of a key column and a value column, presenting the value of a row of the key column adjacent to the value of the row of the value column.

* * * * *